US012028782B2

(12) United States Patent
Bowman et al.

(10) Patent No.: US 12,028,782 B2
(45) Date of Patent: Jul. 2, 2024

(54) MOBILE MESSAGING PLATFORM

(71) Applicant: BAMTech, LLC, New York, NY (US)

(72) Inventors: Robert A. Bowman, Westport, CT (US); Adam D. Ritter, New York, NY (US); Charles Evans, New York, NY (US); Lincoln Hochberg, Hoboken, NJ (US); Tracy Pesin, Brooklyn, NY (US); Jeremy Hunt Schoenherr, Brooklyn, NY (US); Robert Spychala, Brooklyn, NY (US)

(73) Assignee: BAMTECH, LLC, New York, NY (US)

(*) Notice: Subject to any disclaimer, the term of this patent is extended or adjusted under 35 U.S.C. 154(b) by 0 days.

(21) Appl. No.: 17/652,325

(22) Filed: Feb. 24, 2022

(65) Prior Publication Data

US 2022/0272500 A1 Aug. 25, 2022

Related U.S. Application Data

(60) Continuation of application No. 16/588,742, filed on Sep. 30, 2019, now Pat. No. 11,272,329, which is a continuation of application No. 15/211,410, filed on Jul. 15, 2016, now Pat. No. 10,455,374, which is a division of application No. 12/314,902, filed on Dec. 18, 2008, now Pat. No. 9,397,860.

(51) Int. Cl.

| | |
|---|---|
| ***G06F 15/16*** | (2006.01) |
| ***H04L 51/04*** | (2022.01) |
| ***H04L 67/55*** | (2022.01) |
| ***H04W 4/12*** | (2009.01) |
| *H04L 51/58* | (2022.01) |

(52) U.S. Cl.
CPC ............... *H04W 4/12* (2013.01); *H04L 51/04* (2013.01); *H04L 67/55* (2022.05); *H04L 51/58* (2022.05)

(58) Field of Classification Search
CPC .......... H04W 4/12; H04L 67/55; H04L 51/04; H04L 51/58
See application file for complete search history.

(56) References Cited

U.S. PATENT DOCUMENTS

| | | | | |
|---|---|---|---|---|
| 2003/0144018 | A1* | 7/2003 | Minnick | H04W 36/22 455/518 |
| 2004/0093394 | A1* | 5/2004 | Weber | G06Q 30/02 709/219 |
| 2004/0180676 | A1* | 9/2004 | Haumont | H04W 8/26 455/461 |
| 2006/0227704 | A1* | 10/2006 | Nakagawa | H04L 45/00 370/389 |

* cited by examiner

*Primary Examiner* — Normin Abedin
(74) *Attorney, Agent, or Firm* — Fay Kaplun & Marcin, LLP

(57) ABSTRACT

A method for providing mobile messages includes generating a message based on received content. A first functional bind to an aggregator is identified. A second functional bind to the aggregator is also identified. The first functional bind and the second functional bind are distinct communication connections to the aggregator. First message recipients are associated with the first functional bind, and second message recipients are associated with the second functional bind. The message is provided in parallel to the aggregator for the first message recipients through the first functional bind and for the second message recipients through the second functional bind.

20 Claims, 3 Drawing Sheets

MOBILE MESSAGING PLATFORM

FIELD

The subject of the disclosure relates generally to a platform for mobile messaging. More specifically, the embodiments of the present disclosure relate to a mobile messaging platform with rerouting and real time delivery capacity for providing fast, efficient, and reliable mobile messaging services.

BACKGROUND

In recent years, mobile messaging has become a growing industry which is increasingly popular with consumers. For example, it is estimated that over 28 billion mobile messages are being sent per month. Mobile messages can include text messages, picture messages, video messages, and other binary content messages. The mobile messages can be sent and received by a mobile device such as a cellular telephone, personal digital assistant (PDA), handheld gaming device, etc. Mobile messages can also be sent by content providers to provide consumers with content for purchase, alerts, sports updates, news updates, contests, etc.

Traditional content providers often work with aggregators to distribute and/or receive mobile messages. An aggregator can refer to any business entity which maintains agreements with one or more network providers (or carriers) to act as a middleman for providing network access to content providers who do not have a direct relationship with the network providers. As such, content providers can provide their aggregator(s) with messages addressed to mobile units, and the aggregator can route the messages to the mobile units using the carrier networks. The inventors have perceived that traditional aggregators are subject to networking errors, software/hardware failures, and other malfunctions which cause the aggregators to lose contact with the network providers and/or the content providers. During this down time, the content providers may be unable to send or receive mobile messages, resulting in message backups and poor customer satisfaction. The inventors have also perceived that mobile messaging systems are limited by their inability to efficiently and rapidly provide end users with real time or near real time messages concerning alerts, events, warnings, etc.

Thus, the inventors have perceived a need for a mobile messaging platform capable of providing continuous service in the event of an aggregator malfunction. The inventors have also perceived a need for a mobile messaging platform that efficiently maintains subscriber relationships and provides high speed, efficient, and reliable messaging services based on real time feeds.

SUMMARY

An exemplary method for providing mobile messages is provided. The method includes generating a message based on received content. A first functional bind to an aggregator is identified. A second functional bind to the aggregator is also identified. The first functional bind and the second functional bind are distinct communication connections to the aggregator. First message recipients are associated with the first functional bind, and second message recipients are associated with the second functional bind. The message is provided in parallel to the aggregator for the first message recipients through the first functional bind and for the second message recipients through the second functional bind.

An exemplary mobile messaging system is also provided. The mobile messaging system includes a mobile messaging platform having a connectivity engine, a bridge framework enterprise service bus in communication with the connectivity engine, and a publishing engine in communication with the bridge framework enterprise service bus. The connectivity engine is configured to establish a plurality of binds to an aggregator. The bridge framework enterprise service bus is configured to receive content from a content source. The publishing engine is configured to generate a message based on the received content and provide the generated message to the aggregator through at least two of the plurality of binds in parallel.

An exemplary computer-readable medium is also provided. The computer-readable medium has computer-readable instructions stored thereon, that, upon execution by a processor, cause the processor to establish a plurality of binds with an aggregator. The computer-readable instructions further cause the processor to receive content from a content source, generate a message based on the received content, and provide the generated message to the aggregator through at least two of the plurality of binds in parallel.

An exemplary method for maintaining service subscribers is also provided. The method includes identifying first information associated with a first subscriber device of a subscriber to a messaging service. A subscriber profile is established based at least in part on the identified first information. Second information is received from the subscriber, and the second information is compared to the subscriber profile. It is determined, based on the comparison, whether the second information was received from the first subscriber device or a second subscriber device. If the second information was received from the second subscriber device, the subscriber profile is automatically updated to associate the subscriber with the second subscriber device.

Other features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

Figure 1:
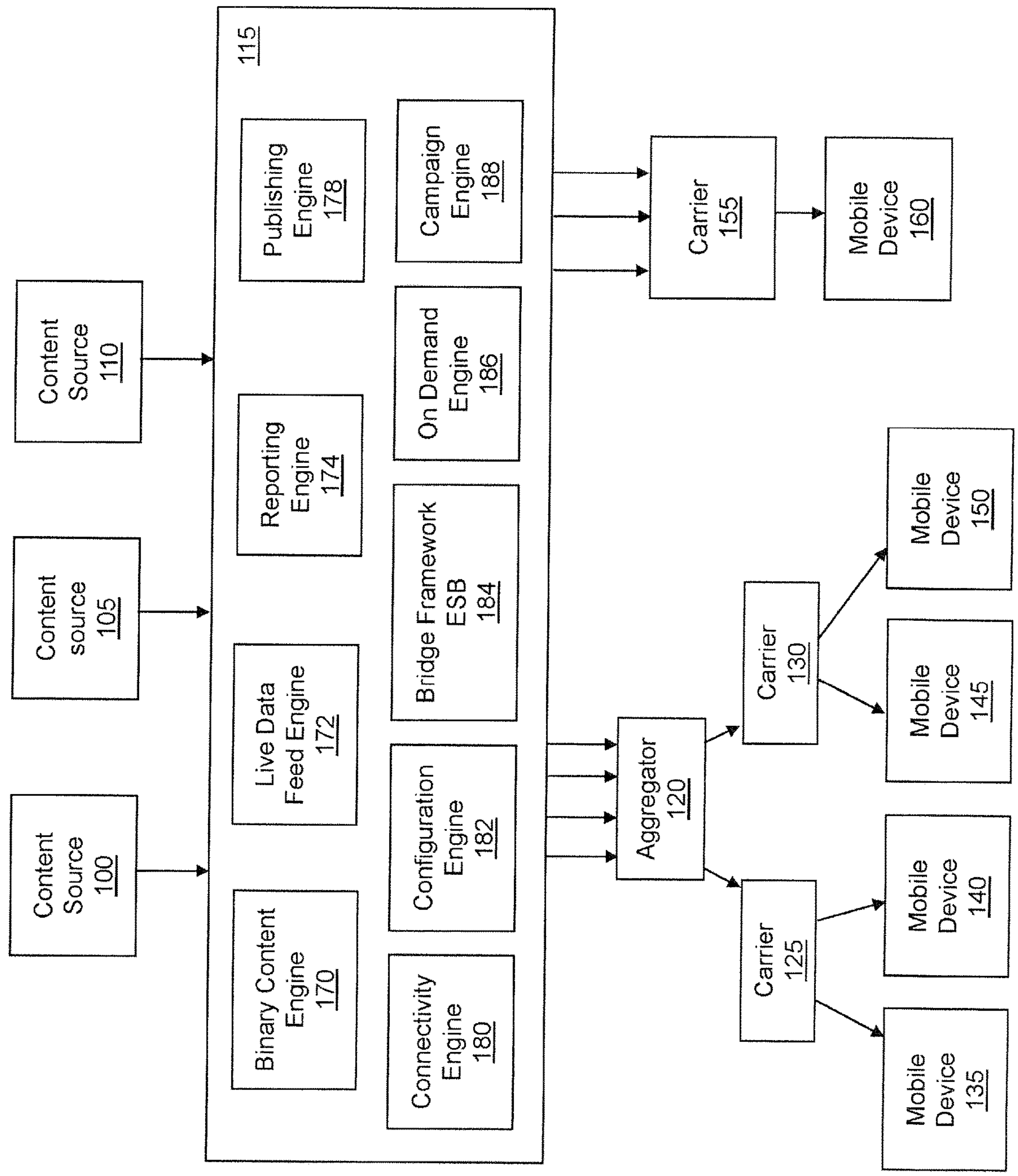
FIG. 1 is a block diagram illustrating a mobile messaging system in accordance with an exemplary embodiment.

FIG. 1 is a block diagram illustrating a mobile messaging system (or system) in accordance with an exemplary embodiment. The system includes a first content source 100, a second content source 105, and a third content source 110. In alternative embodiments, additional or fewer content sources may be used. First content source 100, second content source 105, and third content source 110 are in communication with a mobile messaging platform 115. Communication between the content sources and mobile messaging platform 115 can be implemented through a wired connection or a wireless connection, depending on the embodiment. In an exemplary embodiment, the content sources can be databases, websites, video feeds, information feeds, and/or any other types of information sources. The content sources can provide any type of content to mobile messaging platform 115, including textual content, video content, image content, audio content, binary content, etc.

Mobile messaging platform 115 is in communication with an aggregator 120, and aggregator 120 is in communication with a first carrier 125 and a second carrier 130. In an exemplary embodiment, first carrier 125 can be a network provider that provides service to a plurality of mobile (or subscriber) devices, including mobile device 135 and mobile device 140. Similarly, second carrier 130 can be a network provider that provides service to a plurality of mobile devices, including mobile device 145 and mobile device 150. The mobile devices can be cellular telephones, pagers, personal digital assistants, laptop computers, gaming devices, or any other mobile communication devices known to those of skill in the art. Mobile messaging platform 115 is also in direct communication (i.e., without an aggregator) with a third carrier 155 that provides service to a plurality of mobile devices, including a mobile device 160. In alternative embodiments, mobile messaging platform 115 can be in communication with additional carriers and/or aggregators.

Aggregator 120 can communicate with first carrier 125 through a first short message service center (SMSC) associated with first carrier 125. Similarly, aggregator 120 can communicate with second carrier 130 through a second SMSC associated with second carrier 130. Alternatively, aggregator 120 can communicate with the carriers through any other method(s) known to those of skill in the art. In another alternative embodiment, mobile messaging platform 115 may also be in direct communication with first carrier 125 and second carrier 130. As illustrated with arrows in FIG. 1, mobile messaging platform 115 has four communication connections or binds to aggregator 120 and three binds to carrier 155. The binds can be two-way communication links that allow mobile messaging platform 115 to publish messages and receive information. In alternative embodiments, mobile messaging platform 115 may maintain fewer or additional binds to aggregator 120 and/or carrier 155. As a result of the multiple binds, mobile messaging platform 115 can continue to provide and receive mobile messages to/from the mobile devices in the event that a single bind becomes non-functional. Mobile message rerouting and error detection in binds are described in more detail below.

Mobile messaging platform 115 includes a binary content engine 170, a live data feed engine 172, a reporting engine 174, a publishing engine 178, a connectivity engine 180, a configuration engine 182, a bridge framework enterprise service bus (ESB) 184, an on-demand engine 186, and a campaign engine 188. As used herein, the term engine can refer to any combination of hardware and/or software that is configured to perform one or more designated tasks. The use of distinct engines is for descriptive purposes, and it is to be understood that any of the engines of mobile messaging platform 115 can be combined and that fewer or additional engines may be used.

Bridge framework ESB 184 can be a flexible, standards-based construct that provides foundational services for mobile messaging platform 115. Bridge framework ESB 184 can be used to facilitate coordination, communication, and interaction between the various engines of mobile messaging platform 115. In an exemplary embodiment, bridge framework ESB 184 can be a java application framework that includes a set of core Java classes. As such, bridge framework ESB 184 can facilitate the assembly of the various components of mobile messaging platform 115. Bridge framework ESB 184 can further encapsulate communication between internal processes of mobile messaging platform 115, configure the processes, arrange constituent logic within the processes, and provide low-level failover and redundancy features. Bridge framework ESB 184 further limits the need for redundant coding and testing when components are changed or added to mobile messaging platform 115. As described in more detail below, bridge framework ESB 184 also allows mobile messaging platform 115 to be application independent and to receive content in any of a plurality of different formats.

Connectivity engine 180 can be used to establish and maintain communication connections between mobile messaging platform 115 and content providers, aggregators, and carriers. In an exemplary embodiment, connectivity engine 180 supports complex routing rules and allows mobile messaging platform 115 to be aggregator, carrier, and short-code agnostic. Connectivity engine 180 can allow mobile messaging platform 115 to communicate using short message service (SMS), short message peer-to-peer protocol (SMPP), instant messages, multi-media messaging service (MMS), wireless application protocol (WAP) Push, or any other standards-based messaging protocol or service known to those of skill in the art. In another exemplary embodiment, connectivity engine 180 can be configured to maintain high throughput communication connections (or binds) between mobile messaging platform 115 and a plurality of different aggregators and/or carriers. The high throughput binds enable concurrent, fast, bulk message delivery to subscribers.

As illustrated in FIG. 1, connectivity engine 180 maintains the plurality of binds with aggregator 120 and carrier 155. Connective engine 180 can also maintain the binds between mobile messaging platform 115 and content source 100, content source 105, and content source 110 such that messaging platform 115 is able to receive content from and/or provide content to the content sources. A single bind is illustrated between mobile messaging platform 115 and the content sources. However, in alternative embodiments, mobile messaging platform 115 may maintain a plurality of binds with any or all of the content sources. In an exemplary embodiment, mobile messaging platform 115 is configured to receive content in any of a plurality of formats, process the received content, convert the received content to an appropriate format, and publish the received content as a mobile message. For example, mobile messaging platform 115 can receive first content having a first format from content source 100 and second content having a second format from content source 105. Mobile messaging platform 115 can use bridge framework ESB 184 (or any of the engines) to convert the first content to a third format such that the first content can be processed by publishing engine 178 and/or any other engines of mobile messaging platform 115. Bridge framework ESB 184 can also be used to convert the second content to the third format for processing. Receiving, processing, and publishing received content are described in more detail with reference to FIG. 3.

Connectivity engine 180 can also be used detect communication problems and reconfigure mobile messaging platform 115 in response to any detected problems. For example, connectivity engine 180 may detect that a first bind between mobile messaging platform 115 and aggregator 120 is non-functional. In response, connectivity engine 180 can automatically reconfigure mobile messaging platform 115 to communicate to aggregator 120 through a second bind, a third bind, and/or a fourth bind such that service is not disrupted. Connectivity engine 180 can also monitor aggregator 120 to identify when the first bind again becomes functional. Upon detection that the first bind is functional, connectivity engine 180 can again cause mobile messaging platform 115 to communicate with aggregator 120 using the first bind. Connectivity engine 180 can similarly be used to monitor the binds between mobile messaging platform 115 and carrier 155, reconfigure mobile messaging platform 115 to communicate with carrier 155 only through functional binds, and detect when non-functional binds again become functional. Connectivity engine 180 can monitor binds, detect non-functional binds, and detect non-functional binds using any methods known to those of skill in the art of monitoring communication connections.

Configuration engine 182 can be used to configure and control messaging options. For example, content sources may use configuration engine 182 to control basic message routing, to specify shortcodes for receipt of messages, to establish error messages and conditions for sending the error messages to subscribers, and/or to establish help messages and the conditions for sending the help messages to the subscribers. Subscribers can use configuration engine 182 to specify time periods for receiving alerts, to identify alerts of interest, to subscribe to specific mobile messaging services, for personalizing the format of received messages, for specifying the types of messages to be received, etc. Content sources and/or subscribers can interact with configuration engine 182 through a graphical user interface (GUI). For example, a subscriber can access mobile messaging platform 115 through his/her mobile device, activate the GUI, and specify messaging options, formats, delivery criteria, etc. Subscriber preferences can be saved in a subscriber profile associated with the subscriber. Subscriber interaction is described in more detail with reference to FIG. 2.

Binary content engine 170 can receive binary content from a content source. For example, content source 100 may be a binary content source that provides images, ring tones, computer programs, or other binary content. Binary content engine 170 can receive the binary content and convert the binary content into a mobile message format to be sent to one or more subscribers. Alternatively, the binary content may be received in an appropriate standards-based format. In another alternative embodiment, binary content engine 170 may not be included, and content receipt, conversion, and/or processing may be performed by bridge framework ESB 184.

Live data feed engine 172 can be used to receive real time information regarding a sporting or other live event. For example, content source 105 may provide play-by-play textual or image content corresponding to an ongoing sporting event. Live data feed engine 172 can convert the play-by-play content or other real time information into a mobile message format for delivery to subscribers. As such, the subscribers are able to receive near real time mobile messages with score alerts, play summaries, images, etc. In an alternative embodiment, live data feed engine 172 may not be included, and the above-described functions may be performed by bridge framework ESB 184. Publishing engine 178 can work with bridge framework ESB 184 and/or any other engines to perform additional processing of content, to generate messages based on the content, to identify subscribers that are to receive the messages, and/or to publish the messages to appropriate aggregator(s) and/or carrier(s). In an exemplary embodiment, publishing engine

178 can include a plurality of threads which are able to process content, generate messages, identify subscribers, and/or publish the messages in parallel using the plurality of binds. As a result, message generation and delivery is fast and efficient, and real time content can be provided to subscribers virtually in real time. Parallel publishing is described in more detail with reference to FIG. 3.

Reporting engine 174 can be used to provide detailed reporting data. The reporting data can include information regarding a number of requests for content, a number of successful message deliveries, a number of unsuccessful message deliveries, campaign results, browsing behavior, purchasing behavior, status of the binds between mobile messaging platform 115 and aggregators/carriers, and/or any other information regarding the receipt of content and its delivery as a mobile message. The reporting data can be provided to content sources, subscribers, aggregators, carriers, system administrators, or other interested parties through e-mail, a website, or any another medium.

On demand engine 186 can be configured to provide one or more mobile messages in response to a subscriber request. In one embodiment, on demand engine 186 can operate in response to a keyword received from a subscriber. For example, on demand engine 186 may receive a mobile message with the keyword 'update.' In response, on demand engine 186 can automatically send the subscriber a mobile message with up-to-date baseball scores in games which occurred during the last twenty-four hours. In addition to sports scores, keywords can be used to request news updates, video highlights, almanac information, weather reports, or any other information. As known to those of skill in the art, the subscriber request can be sent to a shortcode associated with a content source, a carrier, an aggregator, and/or mobile messaging platform 115. Alternatively, subscribers may purchase subscriptions to content such that updates, highlights, etc. are automatically sent to the subscriber. On demand engine 186 can also work with binary content engine 170 to provide purchased binary content to subscribers in response to a subscriber request. In an alternative embodiment, on demand engine 186 may not be included, and the above-described functions may be incorporated into publishing engine 178, bridge framework ESB 184, or any other engine. Campaign engine 188 can be used to implement polling campaigns, voting campaigns, text to win contests, etc.

Figure 2:
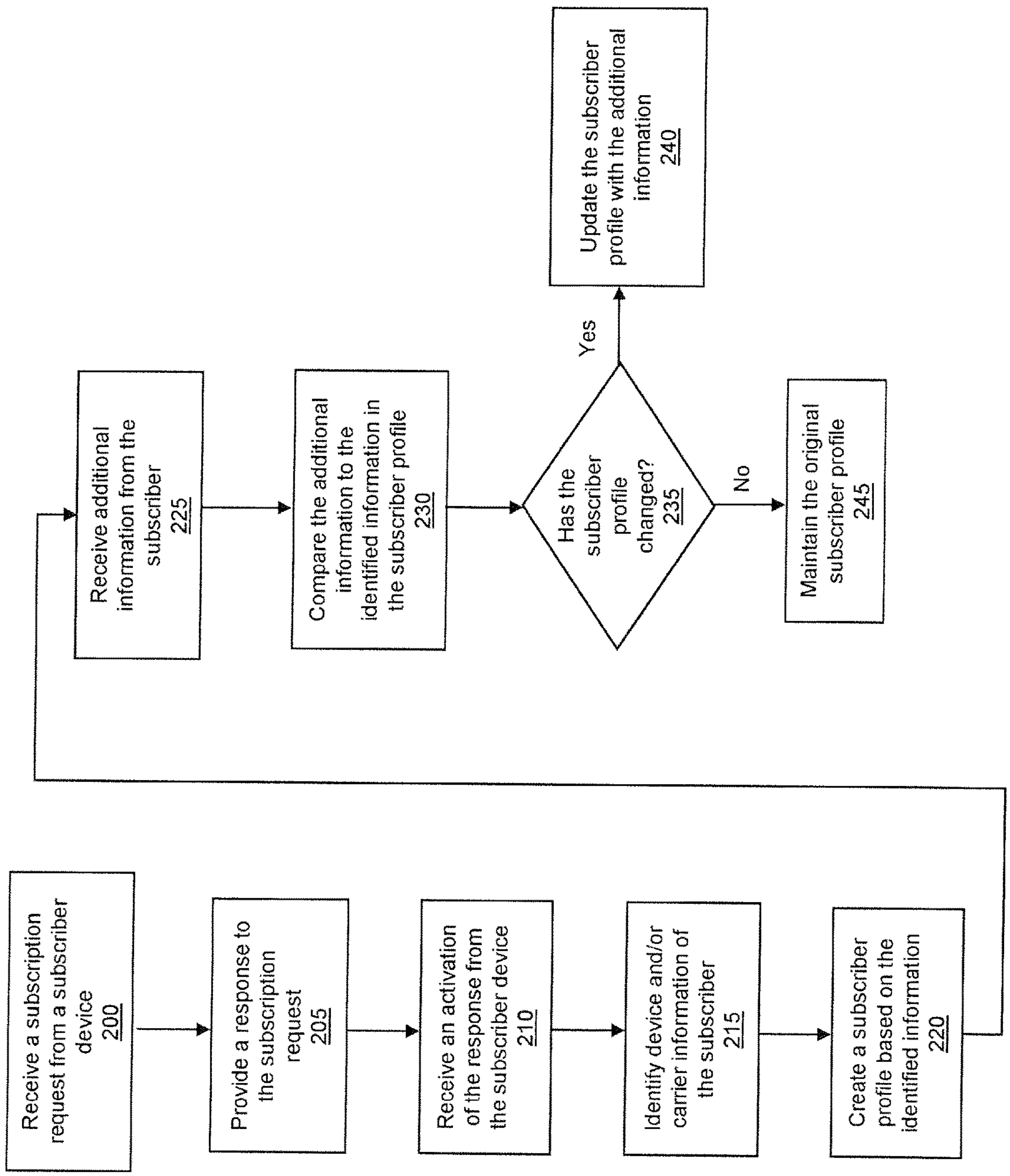
FIG. 2 is a flow diagram illustrating operations performed by the mobile messaging platform of FIG. 1 during a subscription process in accordance with an exemplary embodiment.

FIG. 2 is a flow diagram illustrating operations performed by mobile messaging platform 115 during a subscription process in accordance with an exemplary embodiment. In alternative embodiments, additional, fewer, or different operations may be performed. In an operation 200, a subscription request is received from a subscriber device. The subscription request can be a request to receive periodic content such as alerts or highlights from a content provider. Alternatively, the subscription request may be a one time request for information. In an exemplary embodiment, the subscription request can be in the form of a text message. Alternatively, the subscription request may be received through e-mail, a telephone call, or any other method. The subscriber device can be a cellular telephone, a personal digital assistant (FDA), a portable gaming device, a laptop computer, a desktop computer, or any other communication device.

In an operation 205, a response is provided to the subscription request. In an exemplary embodiment, the response can include an embedded uniform resource locator (URL) or other link, and the subscriber can be prompted to click on or otherwise activate the link. Alternatively, the response may include instructions directing the subscriber to a URL, etc. The response can be provided to the subscriber device through WAP push, using embedded URL technology, or using any other protocol or method. In an operation 210, an activation of the response is received from the subscriber device. For example, upon activation of a link in the response, the subscriber device can be directed to a web page or other network location. In an operation 215, information regarding the subscriber device and/or the carrier used by the subscriber device is identified. The information can include capabilities of the subscriber device, capacities of the subscriber device, protocols supported by the subscriber device, a network browser used by the subscriber device, a telephone number associated with the subscriber device, an Internet protocol address used by the subscriber device, etc. The information can also include any information regarding the carrier used by the subscriber device such as protocols supported by the carrier.

In an operation 220, a subscriber profile is created based on the identified information. In an exemplary embodiment, the subscriber profile includes capabilities of the subscriber device, the type of network browser installed on the subscriber device, and a telephone number associated with the subscriber device. Alternatively, any other identified information can also be included in the subscriber profile. As such, messages delivered to the subscriber device can be customized for the subscriber device and/or the carrier used by the subscriber device. For example, the transport protocol used to deliver messages to the subscriber device can be based on properties of the subscriber device. In some embodiments, the carrier may limit the amount of information which can be identified in operation 215. If the transport protocol(s) supported by the subscriber device cannot be identified or if the subscriber device cannot be identified by a telephone number, etc., messages to the subscriber device can be provided using a transport protocol preferred by the carrier.

In an operation 225, additional information is received from the subscriber. The additional information can include any of the types of information identified in operation 215. The additional information may be received when the subscriber device accesses a specific web page, when the subscriber device makes a request, or by any other communication with the subscriber device. In an operation 230, the additional information is compared to the information identified in operation 215 and included in the subscriber profile. In an operation 235, a determination is made regarding whether the information in the subscriber profile has changed. If the information in the subscriber profile has changed, the subscriber profile is updated in an operation 240. If the information in the subscriber profile has not changed, the original subscriber profile is maintained in an operation 245. As such, mobile messaging platform 115 is able to identify when a new or altered subscriber device is being used without requiring the subscriber device to re-subscribe to the service.

As an example, a subscriber may use a first subscriber device to subscribe to a messaging alert service. As described with reference to operations 215 and 220, information associated with the first subscriber device is identified and used to create a subscriber profile. The subscriber may subsequently obtain a second subscriber device to replace the first subscriber device. The second subscriber device can use the same telephone number as was used by the first subscriber device. Alternatively, other common information may exist between the first subscriber device and the second subscriber device. The subscriber may also make a request or visit a given web page using the second subscriber device. When the subscriber makes the request, visits the web page, etc., additional information is received from the second subscriber device. The additional information can be associated with the subscriber profile because of the common telephone number or other common information. Based on a comparison of the additional information to the information in the subscriber profile, mobile messaging platform 115 can determine that the subscriber has a new subscriber device. As such, the subscriber profile can automatically be updated with the capabilities, capacities, network browser information, etc. of the second subscriber device. As a result, there is no need for the subscriber to re-subscribe to the service when he/she replaces a cellular telephone or other subscriber device. Further, the services provided to the subscriber can be dynamically adjusted without any additional manual input from the subscriber.

Figure 3:
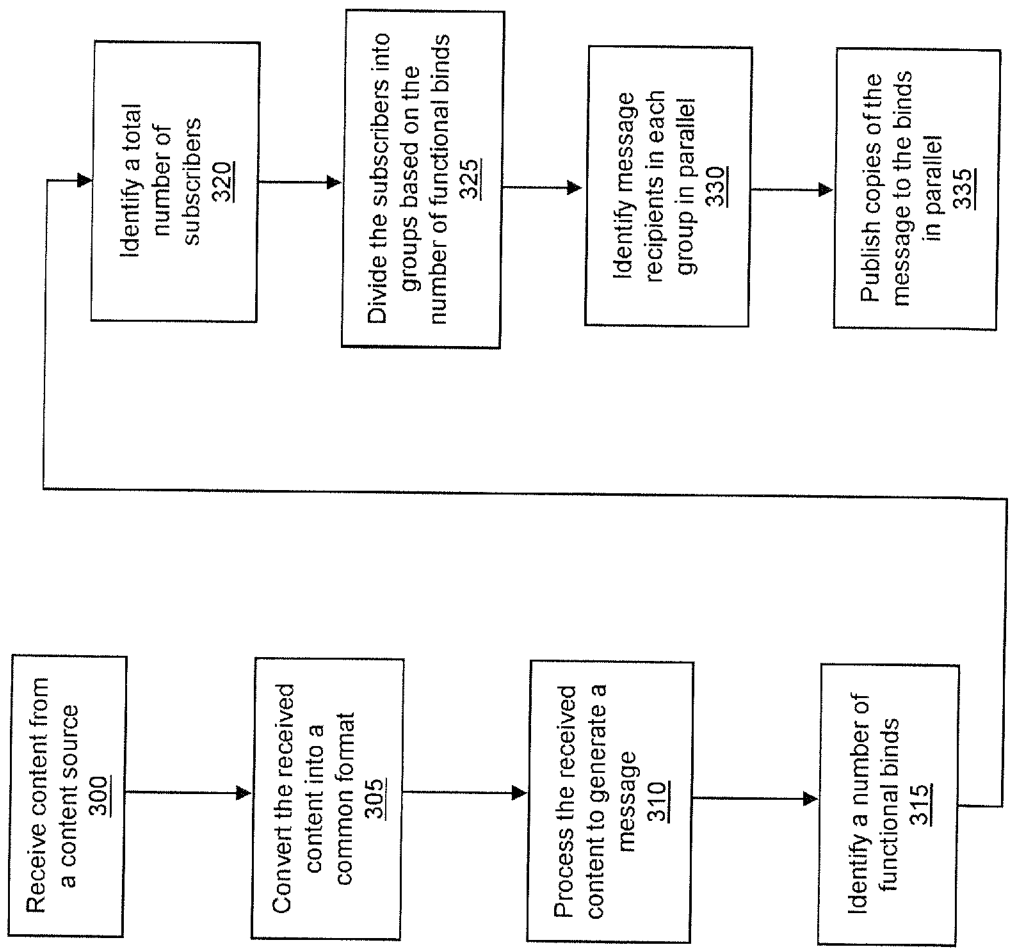
FIG. 3 is a flow diagram illustrating operations performed by a mobile messaging platform to create and deliver mobile messages in accordance with an exemplary embodiment.

FIG. 3 is a flow diagram illustrating operations performed by a mobile messaging platform to create and deliver mobile messages in accordance with an exemplary embodiment. In alternative embodiments, fewer, additional, or different operations may be performed. In an operation 300, content is received from a content source. The received content can be any type of content, including an image, text, video, binary content, etc. The received content can also be stored content or content received from a real-time feed. Further, the received content can be in any of a plurality of formats and/or received through any of a plurality of protocols supported by the mobile messaging platform. Any formats and/or protocols known to those of skill in the art may be supported by mobile messaging platform.

In an operation 305, the received content is converted into a common format. As such, the received content can be handled by the mobile messaging platform in an application-independent fashion. For example, bridge framework ESB 184 described with reference to FIG. 1 may be configured to receive and process all received content, regardless of the content format. As such, content providers using different content formats can be added without having to alter the code or hardware of the mobile messaging platform. In one embodiment, bridge framework ESB 184 may be used to convert the received content into a common format for processing and publishing by other elements of the mobile messaging platform. The common format may be any format which can be recognized by the relevant engines of the mobile messaging platform. Further, the common format may differ based on the type of received content. For example, bridge framework ESB 184 may be used to convert all received video content into a specific (i.e., common) Moving Picture Experts Group (MPEG) format. Similarly, all text may be converted into a common textual format, all images may be converted into a common image format, all audio may be converted into a common audio format, and so on. In an alternative embodiment, all of the engines of mobile messaging platform 115 may be configured to be application-independent, and received content may not be converted into the common format(s).

In an operation 310, the received content is processed to generate a message. The received content can be processed by bridge framework ESB 184 and/or publishing engine 178 described with reference to FIG. 1. Alternatively, any other engine(s) may be used to process the received content and/or generate the message. Processing the received content can include editing the received content to eliminate unnecessary content, to remove inappropriate content, and to otherwise prepare the received content for conversion into a mobile message. Processing the received content can also include identifying and/or generating meta data corresponding to the received content. The meta data can include textual information describing the received content, closed captioned text corresponding to the received content, a time/date corresponding to the received content, symbols, a content identifier, a source identifier, etc. The meta data may also include information regarding the format(s) for the message. Processing the received content can further include converting and/or transcoding the received content into an appropriate format. The appropriate format of the mobile message can be based on aggregator preferences or requirements, carrier preferences or requirements, subscriber preferences or requirements, and/or subscriber device capabilities.

In an operation 315, a number of functional binds is identified. The number of functional binds can be between the mobile messaging platform and a single aggregator or a single carrier. Alternatively, the number of functional binds can be the number of functional binds between the mobile messaging platform and all aggregators and carriers. The number of functional binds can be identified using any method known to those skilled in the art. In an exemplary embodiment, each functional bind can be used to provide the message to a given group of subscribers. The binds can be used in parallel such that message publishing and delivery is fast and efficient.

In an operation 320, a total number of subscribers to the service is identified. The total number of subscribers can be obtained from a subscriber table, a subscriber list, a subscriber profile database, or any other information repository. In an exemplary embodiment, the total number of subscribers may be in relatively constant flux due to subscribers subscribing to and unsubscribing from the service. In an operation 325, the subscribers are divided into groups based on the number of functional binds. Each group of subscribers can correspond to a given range of subscribers within the subscriber base. In an exemplary embodiment, the number of groups of subscribers can be equal to the number of functional binds. In another exemplary embodiment, each group can include an approximately equal number of subscribers.

As an example, there may be 6 functional binds and 30,000 total subscribers. The 6 functional binds may be between the mobile messaging platform and a single aggregator, between the mobile messaging platform and two or more aggregators, between the mobile messaging platform and a single carrier, between the mobile messaging platform and two or more carriers, between the mobile messaging platform and one or more aggregators and one or more carriers, etc. The 30,000 total subscribers can be divided into 6 groups (i.e., one group for each functional bind). The first group can correspond to the range of subscribers from 1-5000, the second group can correspond to the range of subscribers from 5001-10,000, the third group can correspond to the range of subscribers from 10,001-15,000, and so on. In alternative embodiments, the number of groups may not equal the number of functional binds and/or each group may not include an approximately equal number of subscribers. For example, a first bind may be identified as having more bandwidth than the other binds. In such a scenario, the first group corresponding to the first bind may be larger than the groups corresponding to the other binds.

In an operation 330, message recipients in each group are identified in parallel. The message recipients are identified because the number of subscribers which are to receive the message is not necessarily the same as the total number of subscribers. For example, a first subscriber may have set a user preference to receive the generated message, and a second subscriber may have set a user preference to not receive the generated message. Alternatively, the first subscriber may have a subscriber device which is not capable of receiving the generated message. In an exemplary embodiment, the mobile messaging platform can include a plurality of threads which are configured to operate in parallel. As used herein, a thread can refer to any combination of software and/or hardware which is capable of executing independent of other threads such that parallel execution of tasks is achieved.

Continuing the example from above, a first thread can be used to identify message recipients in the first group of subscribers (i.e., subscribers 1-5000), a second thread can be used to identify message recipients in the second group of subscribers (i.e., subscribers 5001-10,000), and so on. In another exemplary embodiment, each thread corresponding to a group can be provided with a copy of the generated message. The copy of the generated message can be encoded with the range of subscribers for which the given thread is responsible. For example, a first copy of the generated message can be provided to the first thread and encoded with the range 1-5000, a second copy of the generated message can be provided to the second thread and encoded with the range 5001-10,000, and so on. Alternatively, any other method can be used to inform individual threads of the ranges of subscribers for which they are responsible. In another alternative embodiment, the total number of message recipients may be identified prior to establishing the groups. In such an embodiment, the groups may include only message recipients, and operation 330 may not be performed.

In an operation 335, an appropriate number of copies of the message are published to each of the binds in parallel. Continuing the example from above, 3000 subscribers from the first group may be identified as message recipients, 2500 subscribers from the second group may be identified as message recipients, 2000 subscribers from the third group may be identified as message recipients, and so on. As such, 3000 copies of the generated message can be published to the aggregator (or carrier) by the first thread using the first bind. Similarly, 2500 copies of the generated message can be provided to the aggregator by the second thread using the second bind, 2000 copies of the generated message can be provided to the aggregator by the third thread using the third bind, and so on. The six threads can operate in parallel such that each of the 6 binds is used to simultaneously deliver the generated messages to the aggregators/carriers.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents. Further, one or more flow diagrams have been used to describe exemplary embodiments. The use of flow diagrams is not meant to be limiting with respect to the order of operations performed.

What is claimed is:

1. A method for providing messages using a mobile messaging platform, comprising:

establishing a plurality of binds to an aggregator, wherein each bind is a separate communication link;

receiving content from a content source;

identifying a plurality of functional binds based on identifying at least one non-functional bind from the plurality of hinds due to at least one of a networking error, a software failure or a hardware failure;

generating a plurality of messages based on the received content, wherein each of the plurality of messages is for a different subscriber device;

providing the plurality of messages to the aggregator via the plurality of functional binds; and monitoring the aggregator to identify when the at least one non-functional hind becomes functional, wherein the at least one non-functional bind provides messages to the aggregator when the at least one non-functional bind becomes functional.

2. The method of claim 1, further comprising:

converting the received content into a common format.

3. The method of claim 1, wherein the received content comprises at least one of real-time information or content corresponding to an event.

4. The method of claim 1, wherein a first set of messages from the plurality of messages is provided to the aggregator on a first functional bind and a second set of messages from the plurality of messages is provided to the aggregator on a second functional bind in parallel to the first set of messages.

5. The method of claim 1, further comprising:

generating a subscriber profile for a subscriber of a messaging service; and determining whether the subscriber is to be a recipient of one of the plurality of messages based on the subscriber profile.

6. The method of claim 5, further comprising:

receiving first information from a first subscriber device, wherein the subscriber profile is based on the first information;

receiving second information from a second different subscriber device; and automatically updating the subscriber profile to associate the subscriber with the second different subscriber device in response to receiving the second information.

7. The method of claim 6, wherein the first subscriber device and the second different subscriber device are associated with a same telephone number.

8. A method for providing messages using a mobile messaging platform, comprising:

establishing a plurality of binds to a carrier network, wherein each bind is a separate communication link;

receiving content from a content source;

identifying a plurality of functional binds based on identifying at least one non-functional bind from the plurality of binds due to at least one of a networking error, a software failure or a hardware failure;

generating a plurality of messages based on the received content, wherein each of the plurality of messages is for a different subscriber device;

providing the plurality of messages to the aggregator via the plurality of functional binds; and monitoring the aggregator to identify when the at least one non-functional bind becomes functional, wherein the at least one non-functional bind provides messages to the aggregator when the at least one non-functional bind becomes functional.

9. The method of claim 8, further comprising:

converting the received content into a common format.

10. The method of claim 8, wherein the received content comprises at least one of real-time information or content corresponding to an event.

11. The method of claim 8, wherein a first set of messages from the plurality of messages is provided to the aggregator on a first functional bind and a second set of messages from the plurality of messages is provided to the aggregator on a second functional bind in parallel to the first set of messages.

12. The method of claim 8, further comprising:

generating a subscriber profile for a subscriber of a messaging service; and determining whether the subscriber is to be a recipient of one of the plurality of messages based on the subscriber profile.

13. The method of claim 12, further comprising:

receiving first information from a first subscriber device, wherein the subscriber profile is based on the first information;

receiving second information from a second different subscriber device; and automatically updating the subscriber profile to associate the subscriber with the second different subscriber device in response to receiving the second information.

14. The method of claim 13, wherein the first subscriber device and the second different subscriber device are associated with a same telephone number.

15. A mobile messaging system, comprising:

one or more processors of a mobile messaging platform configured to perform operations comprising:

establishing a plurality of binds to an aggregator, wherein each hind is a separate communication link;

receiving content from a content source;

identifying a plurality of functional binds based on identifying at least one non-functional bind from the plurality of binds due to at least one of a networking error, a software failure or a hardware failure;

generating a plurality of messages based on the received content, wherein each of the plurality of messages is for a different subscriber device;

providing the plurality of messages to the aggregator via the plurality of functional binds; and monitoring the aggregator to identify when the at least one non-functional bind becomes functional, wherein the at least one non-functional bind provides messages to the aggregator when the at least one non-functional bind becomes functional.

16. The system of claim 15, wherein a first set of messages from the plurality of messages is provided to the aggregator on a first functional bind and a second set of messages from the plurality of messages is provided to the aggregator on a second functional bind in parallel to the first set of messages.

17. The system of claim 15, wherein the operations further comprise:

generating a subscriber profile for a subscriber of a messaging service; and determining whether the subscriber is to be a recipient of one of the plurality of messages based on the subscriber profile.

18. The system of claim 17, wherein the operations further comprise:

receiving first information from a first subscriber device, wherein the subscriber profile is based on the first information;

receiving second information from a second different subscriber device; and automatically updating the subscriber profile to associate the subscriber with the second different subscriber device in response to receiving the second information.

19. The system of claim 15, wherein the first subscriber device and the second different subscriber device are associated with a same telephone number.

20. The system of claim 13, wherein the received content comprises at least one of real-time information or content corresponding to an event.

* * * * *

UNITED STATES PATENT AND TRADEMARK OFFICE

CERTIFICATE OF CORRECTION

PATENT NO. : 12,028,782 B2
APPLICATION NO. : 17/652325
DATED : July 2, 2024
INVENTOR(S) : Bowman et al.

It is certified that error appears in the above-identified patent and that said Letters Patent is hereby corrected as shown below:

In the Claims

Claim 1, Column 11, Lines 2-3:
"at least one non-functional bind from the plurality of hinds due to at least one of a networking error," should read "at least one non-functional bind from the plurality of binds due to at least one of a networking error,".

Claim 1, Column 11, Line 11:
"one non-functional hind becomes functional, wherein" should read "one non-functional bind becomes functional, wherein".

Claim 15, Column 12, Line 29:
"wherein each hind is a separate communication link" should read "wherein each bind is a separate communication link".

Signed and Sealed this
First Day of October, 2024

Katherine Kelly Vidal

Katherine Kelly Vidal
*Director of the United States Patent and Trademark Office*